Feb. 6, 1968    J. R. MENDEZ    3,367,045
KEY OPERATED PHONETIC SOUND AND REPRODUCING DEVICE
Filed May 28, 1965    5 Sheets-Sheet 1
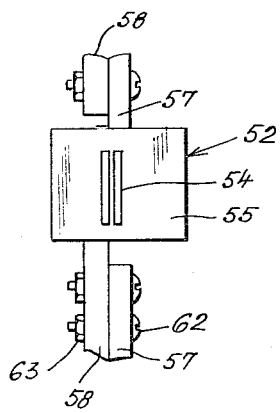
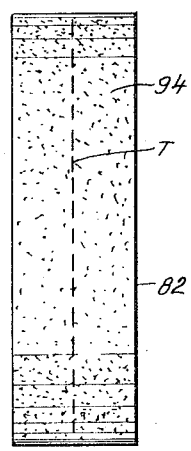
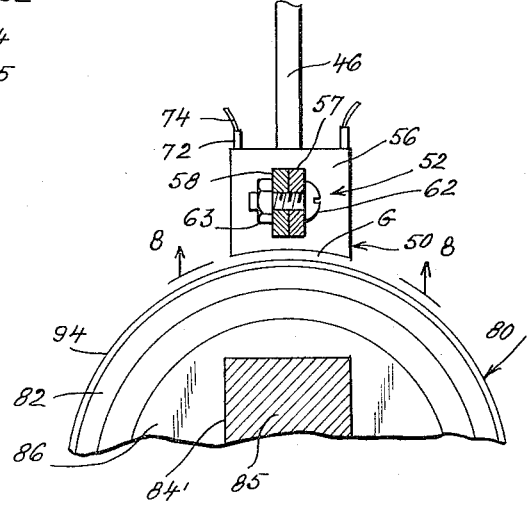
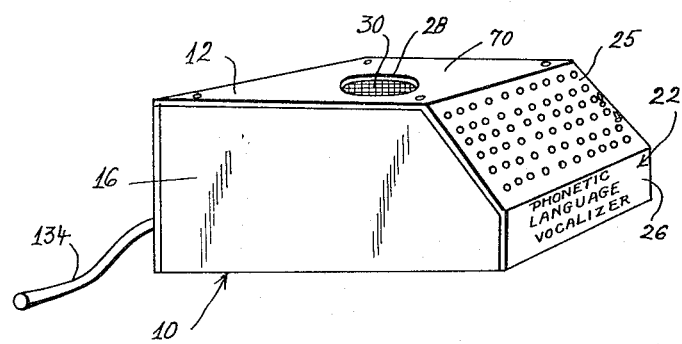
INVENTOR
Joseph R. Mendez
BY

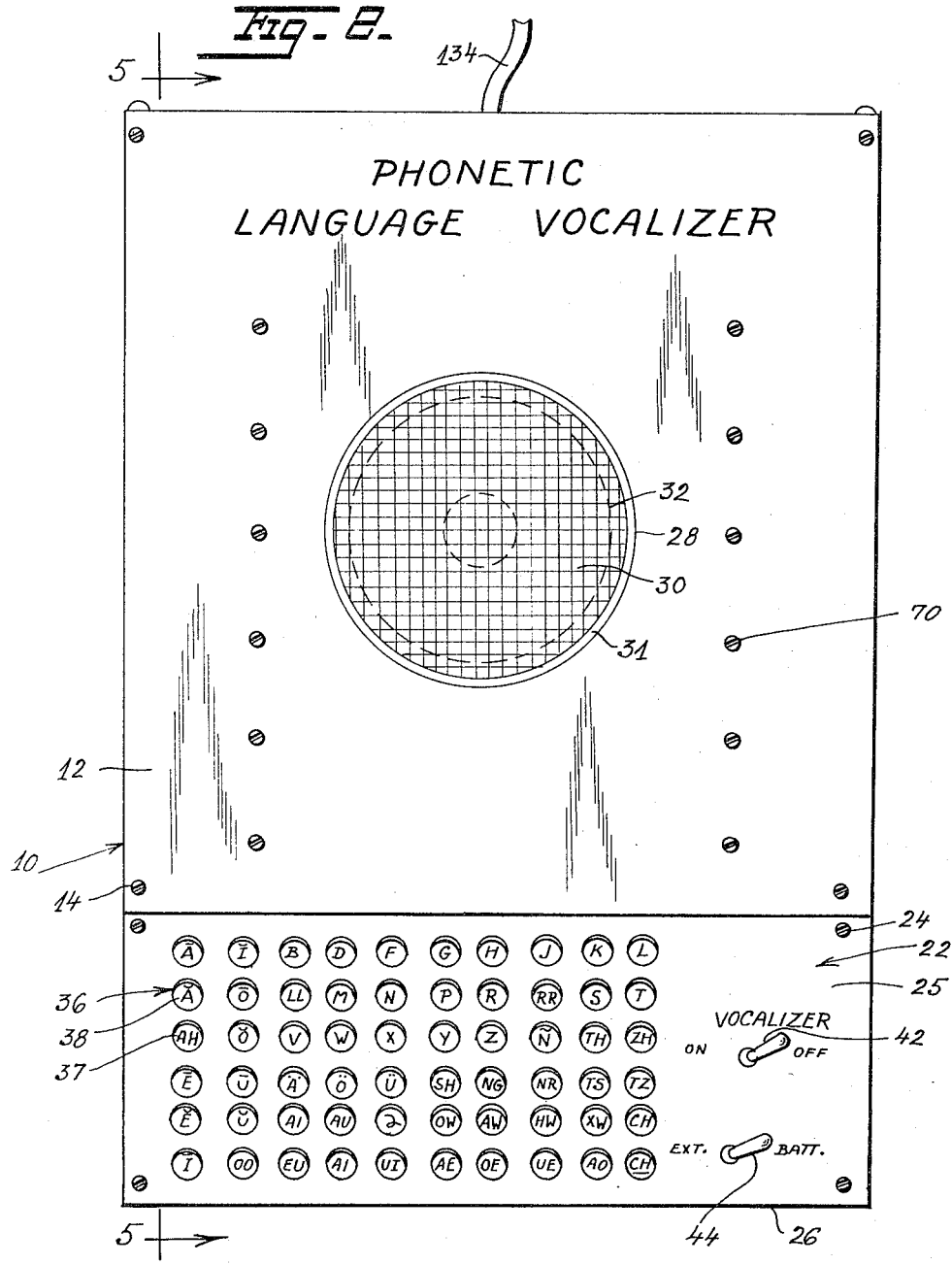

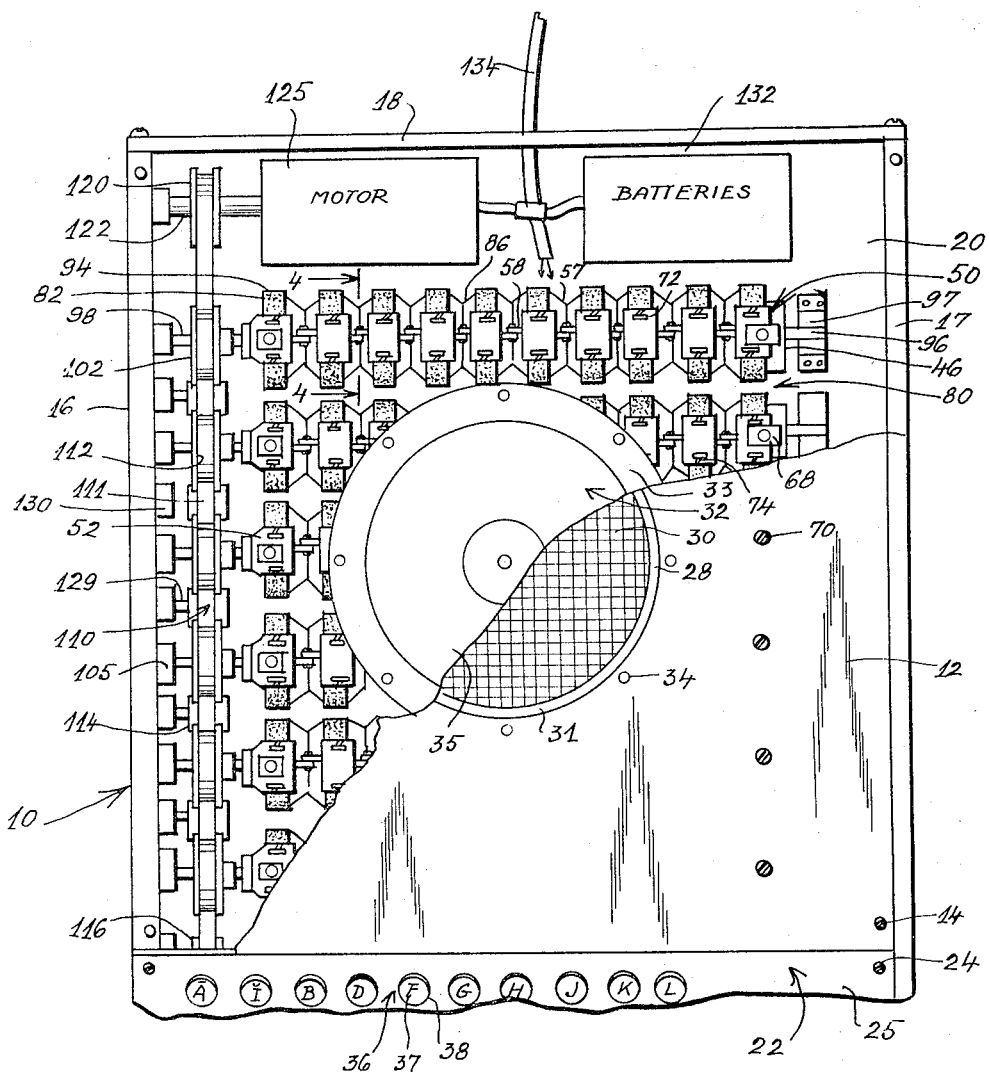

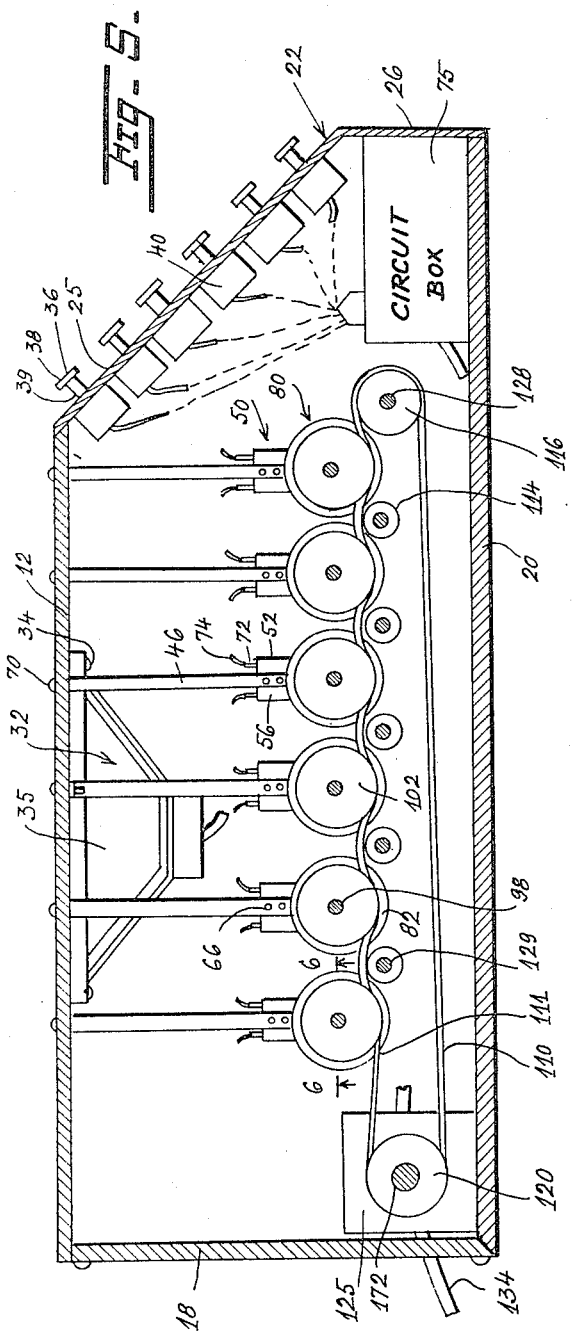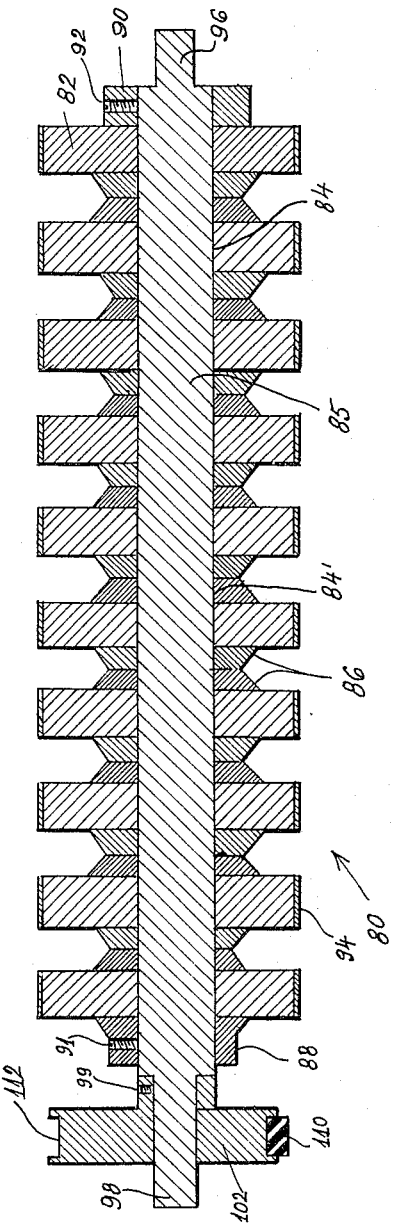

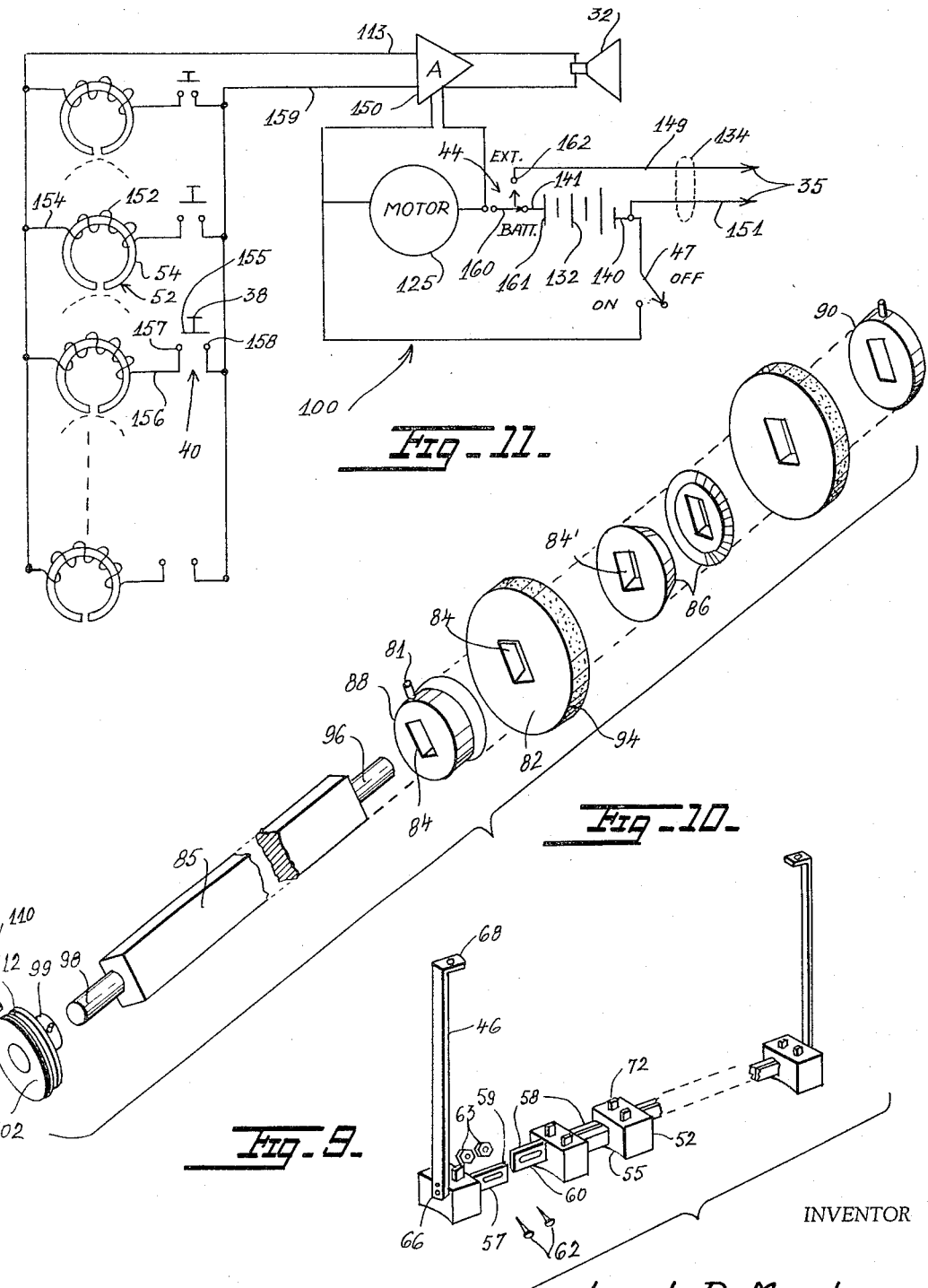

United States Patent Office 3,367,045
Patented Feb. 6, 1968

3,367,045
KEY OPERATED PHONETIC SOUND AND
REPRODUCING DEVICE
Joseph R. Mendez, 232 E. 165th St.,
New York, N.Y. 10456
Filed May 28, 1965, Ser. No. 459,584
7 Claims. (Cl. 35—5)

ABSTRACT OF THE DISCLOSURE

The disclosure describes a key operated phonetic sound reproducing device. The device is housed in a cabinet in which is a plurality of simultaneously rotatable assemblies of magnetic record disks. Magnetic heads are suspended over the disks from the cover of the cabinet. When the cover is removed all the heads are removed and exposed. Each of the disk assemblies can be individually removed and selected disks can be removed and replaced with others.

This invention relates generally to the art of sound reproduction devices employing magnetic sound tracks and more particularly concerns a key operated phonetic sound reproducing device.

The invention is especially intended to use as an educational device in teaching various languages. It is operated by a student to reproduce phonetically any word or sequence of words in a multiplicity of languages. Heretofore students of various languages have had to rely on the phonetic markings or spellings of words in various language dictionaries as a guide to how the words are pronounced. Such visual indications have served to only a limited extent as guides to the correct pronunciation of the words. What has been lacking is a suitable audible index to correct pronunciation. Language teaching phonograph records which have been heretofore available have presented only a limited number of words. Furthermore, it has not been possible for a student to reproduce audibly from such a record only a single word, or to reproduce a particular word over and over again.

The present invention is directed at overcoming the above mentioned and other deficiencies and difficulties heretofore encountered by students of language phonetics by providing a novel phonetic vocalizing device. According to the invention the vocalizing device has a plurality of continuously rotating disks on which are magnetic tracks. Recorded on these tracks are individual sounds representing vowels, consonants, diphthongs and diagraphs. Associated with each disk are assembled on rotating shafts and groups of heads are suspended adjacent the disks. The disks and heads are installed in a cabinet along with a motor for driving the disks. The device has a keyboard on which are keys or buttons disposed for operation actuation by a user of the device. Each key is lettered with a different symbol indicating a phoneme or single phonetic sound represented by a vowel, consonant, diphthong or digraph. The keys operate associated switches connected in circuit with the respective magnetic heads, an amplifier and a loudspeaker. The operator of the device can press selected keys in sequence to reproduce audibly any word or sequence of words in any one or more of a multiplicity of languages. The words can be reproduced over and over again at any desired speed. The device may be operated from a self-contained power supply or from an external power supply.

It is therefore one object of the invention to provide a phonetic vocalizing device capable of reproducing audibly individual selected phonetic sounds.

A further object is to provide an electroacoustic phonetic vocalizer responsive to operation of individual keys for reproducing in response to such operation, selected phonetic sounds.

Still another object is to provide a phonetic vocalizer as described including a multiplicity of continuously rotating disks having magnetic tracks on which are recorded individual phonetic sounds corresponding to symbols appearing on the individual keys of the vocalizer.

Another object is to provide a phonetic vocalizer as described wherein each track has an associated electromagnetic transducer head for picking up individual phonetic sounds from the respective tracks.

A further object is to porvide the phonetic vacalizer with circuitry including an amplifier, loudspeaker, the individual transducer heads, and pushbutton switches actuated by the several keys.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view on a reduced scale of a vocalizer device embodying the invention.

FIG. 2 is an enlarged top plan view of the device.

FIG. 3 is a top plan view of part of the device with a portion of the cabnet top broken away to show internal construction.

FIG. 4 is a further enlarged fragmentary vertical sectional view taken on line 4—4 of FIG. 3.

FIG. 5 is a vertical sectional view taken on line 5—5 of FIG. 2.

FIG. 6 is a further enlarged sectional view taken on line 6—6 of FIG. 5.

FIG. 7 is an enlarged end elevational view of a single sound disk with phonetic magnetic track.

FIG. 8 is a bottom plan view of an electromagnetic transducer head taken on curved line 8—8 of FIG. 4.

FIG. 9 is a reduced partially exploded perspective view of a transducer head assembly, parts being omitted.

FIG. 10 is an exploded perspective view of parts of a rotatable sound disk assembly.

FIG. 11 is a simplified diagram of the electric circuit of the device.

Referring first to FIGS. 1–3 and 5, the device includes a cabinet 10 having a removable top cover plate 12 mounted by corner screws 14 on vertical opposing side walls 16, 17. The cabinet has a vertical, removable back panel or wall 18 held on by screws 19 inserted in ends of walls 16, 17. Side walls 16, 17 are integral with a bottom of base plate 20. A front panel 22 is mounted by screws 24 on forward edges of walls 16. Panel 22 has a sloping upper portion 25 and a vertical, narrow bottom portion 26. The forward edges of walls 16, 17 conform to the angular dispositions of portions 25, 26 of front panel 22.

In top cover plate 12 is a central aperture 28 closed by mesh screen 30 under which is mounted an electromagnetic loudspeaker 32. The loudspeaker has a rim 33 through which screws 34 are inserted and engaged in threaded holes in top plate 12. Screen 30 is mounted in a ring 31 in aperture 28. The cone 35 of the loudspeaker is exposed to the screen to project sounds through aperture 28.

A plurality of keys 36 are mounted at front panel portion 25. These keys have operating buttons 38 spring biased upwardly. The keys can be individually manually pressed down. On each button is a different symbol 37 representing a vowel, consonant, diphthong or digraph. Each key includes a shaft 39 connected to and serving as an operating member for a pushbutton switch 40 secured to the underside of panel portion 25. Two manually operable control switches 42 and 44 are also located on panel portion 25.

Secured to the underside of cover plate 12 is a plurality of pairs of vertical frame bars 48. Each pair of frame bars is located at opposite ends of a different transducer head assembly 50 best shown in FIGS. 3–5, 8, 9. Each head assembly has ten electromagnetic heads 52. Each head has a magnetic core 54 shown in FIG. 8 exposed at the bottom curved face 55 of one head 52. The cores are embedded in plastic rectangular bodies 56 which are detachably connected to each other. Each head except the heads on the right and left as viewed in FIG. 3 has two laterally extending vertical leaves 57, 58 provided with slots 59, 60. Two screws 62 are engaged in registering slots of each two juxtaposed leaves. Nuts 63 are engaged on the screws. By this arrangement the several heads 52 can be adjustably positioned laterally of each other and then fixed in position. Also any one head can be removed and replaced by another if necessary. The left and right heads have only single rightward and leftward extending leaves 57 and 58 respectively. Frame bars 46 are secured by screws 66 on outer sides of the outer heads of each head assembly. The upper ends of the frame bars are formed with threaded, apertured horizontally extending flanges 68 which receive screws 70 and support the head assemblies suspended from the cover plate 12. When the cover plate is removed and inverted all the heads and the loudspeaker which are carried by the cover plate are exposed. Each head has two lugs 72 connected to ends of a coil in each head. Wires 74 are connected from lugs 72 in a circuit 100 shown in FIG. 11, explained in detail below. A box 75 containing parts of the circuit is located at the front of the cabinet as shown in FIG. 5.

Located under each head assembly 50 is a plurality of disk assemblies 80. Each disk assembly as best shown in FIGS. 3, 6 and 10 includes a plurality of nonmagnetic metal or plastic disks 82. Each disk has a rectangular hole 84. A rectangular shaft 85 extends through the holes 84 in all disks. Pairs of spacer plates 86 are disposed between each pair of disks 82. Each of the spacers 86 has a rectangular hole 84' registering with hole 84 in an adjacent disk 82. Rings 88, 90 at opposite ends of each group of disks 82 are provided with set screws 91, 92. These have apertures 84''. They engage the rectangular shaft and hold the disks 82 and spacers securely on the shaft.

Each disk 82 has a magnetic coating or film 94 applied thereto. The coating extends continuously circumferentially of the periphery of the disk. On a magnetic track T on this coating is magnetically recorded a phonetic sound; see FIG. 7. Each head 52 is disposed to pick up magnetically the recorded sound recorded on the track T of its associated disk 82. One head 52 is located over each disk and is slightly spaced by airgap G from magnetic coating 94; see FIG. 4.

Each shaft 85 has a cylindrical stub end 96 which is journaled in a bearing bracket 97 secured to the bottom 20 of the cabinet. At the other end of each shaft is a longer stub 98 on which is secured by a set screw 99 a pulley 102. The pulleys of all the disk assemblies are disposed in coplanar alignment. The pulleys rotate in a common vertical plane. The shaft stubs 98 are journaled in bearings 105 mounted on the inner side of left wall 16.

A drive belt 110 passes underneath each pulley. The upper course 111 of the belt engages in the bottom of circumferential groove 112 of each pulley. The belt course 111 passes alternately under each pulley 102 and over an idler roller 114. The idler rollers are located so that they keep belt 110 tensioned and in frictional engagement with each pulley 102. The forward end loop of the belt passes over and around an idler pulley 116. The rear end loop of the belt passes around a drive pulley 120 mounted on shaft 122 of drive motor 125. Pulley 116 and idler rollers 114 are carried by stub shafts 128, 129 journaled in bearings 130 mounted on the inner side of wall 16.

Motor 125 is shown energized by an assemblage of batteries 132 which provide power for the motor and the circuitry of the device, shown in FIG. 11. A power supply cable 134 terminating in a plug 135 is provided as an alternate external source of power as will be explained in connection with FIG. 11 to which reference is now made.

Batteries 132 have one terminal 140 connected in series circuit with ON-OFF switch 42 and both motor 125 and an audio amplifier 150. External line 151 of cable 134 is also connected to switch 42. The amplifier is preferably a transistorized electronic amplifier to conserve power, and to minimize weight and internal heating of the device. The amplifier drives loudspeaker 32.

The coils 152 on cores 54 of all magnetic heads 52 each have one terminal 154 connected in common to one input terminal 153 of amplifier 150. The other terminal 156 of each coil is connected to one contact 157 of a different normally open pushbutton switch 40. Each switch is operated by its own individual button 38. The other contact 158 of each switch 40 is connected to the other input terminal 159 of the amplifier. Each switch has a spring biased bridging contact 155 normally spaced from contacts 157, 158 but closing therewith when button 38 is pressed.

The motor and amplifier may be energized directly by an external power supply to which plug 135 at the end of power cable 135 may be connected. The batteries 132 can be cut out of the circuit by setting EXT.-BATT. switch 44 to EXT. position. Switch 44 is a double-throw switch. Pole 160 is connected to both the motor and amplifier. Switch contact 161 at the BATT. position is connected to terminal 141 of the battery. Switch contact 162 at EXT. position is connected to power line 149. When switch 44 is set to EXT. position, power may be drawn from an external power supply to energize the motor and amplifier and the batteries are cut out of the circuit.

Operation of the device is very simple. The user first determines the phonetic spelling of a word or sequence of words in any language. Such spelling is obtained from a language instruction book, dictionary, etc. Following is a specific example of one way the device may be used. Suppose the user is interested in hearing and learning the correct pronunciation of a word such as "World" in different languages such as English, German, French, Italian, Portugese, Spanish. On looking up these words in suitable dictionaries the following data will be obtained:

| Language | English | German | French | Italian | Portugese | Spanish |
| --- | --- | --- | --- | --- | --- | --- |
| Word | World | Welt | Monde | Mondo | Mundo | Mundo |
| Phonetic | oo-rld | Velt | Mond | Mawndo | Moondoo | Moondo |

The user will locate the several phonetic vowels, consonants, diphthongs or digraphs as presented by symbols 47 on buttons 38 of the keys 36. As each key is pressed in turn the sound of that represented by the selected symbol will sound through the loudspeaker 32. If the key is held down the sound will be repeated over and over. By pressing the keys in succession fairly rapidly to produce each sound only once, a selected words will be correctly pronounced in any language. For some simple words the phonetic spelling and the orthographic spelling will be the same. In general, however, it will be necessary to determine the correct phonetic spelling. As examples, the German "W" is pronounced "V." The "E" is silent in the French word "Monde" and the "o" has different sounds in English, Italian, Spanish and Portugese. Since English and foreign language dictionaries provide phonetic spellings the user of the device will have no difficulty in obtaining the phonetic information required to operate the device properly.

Any word for which a phonetic spelling is obtainable and for which phonetic symbols are indicated on keys 36 can be audibly reproduced. The scope of the device can be enlarged by provided more magnetic head and more keys for reproducing characteristic sounds from other languages such as Russian, Japanese, Arabic, etc. It will be at once apparent that the device is capable of "speaking" correctly an unlimited number of different words in a multiplicity of languages. This number may run to the hundreds of thousands. It is actually incalculable, but in any case it is beyond the capacity of any language phonograph record or any number of such records. It is beyond the capacity of any human instructor or group of instructors. The device will make teaching and learning of languages and phonics simpler, easier, faster and more precise. The device will have utility in a wide range of applications in schools, libraries and wherever correct, audible, repeated, pronunciation of phonetic sounds is desired. The device can be made up in different sizes with more or less keys illustrated, with more or less pre-recorded disks 82 and heads 52 in each assembly, and with more or less than the six disk and head assemblies illustrated in the drawings.

It should be noted that all of the magnetic heads will be physically removed and exposed when the cover is removed from the cabinet. This makes it possible to clean and service the heads conveniently. Furthermore when the cabinet cover and heads are removed all the magnetic disk assemblies are exposed. Each of the disk assemblies can be individually removed and selected disks can be removed and replaced with others.

It should be noted that all of the magnetic heads heads will be physically removed and exposed when the cover is removed from the cabinet. This makes it possible to clean and service the heads conveniently. Furthermore when the cabinet cover and heads are removed all the magnetic disk assemblies are exposed. Any one disk assembly can be removed without disturbing any of the others because of the unique mounting and belt drive of the assemblies. Any selected disks can be removed from the removed disk assembly and replaced with others having different sounds recorded thereon. If desired, the removed disks can later be replaced. The provision of a multiplicity of disk assemblies provides a greater record capacity than could be obtained on a single unitary record drum of comparable size.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A phonetic vocalizing device, comprising a plurality of rotatable disk assemblies, each of said disk assemblies including a shaft and a plurality of axially spaced, parallel disks removably mounted on and rotatable with said shaft, so that any selected disks on a shaft in any one disk assembly are removable and replaceable with other disks without disturbing the other disk assemblies, each of said disks having a circumferential magnetic track thereon, motor means operatively connected to the shafts for rotating all of the disks simultaneously and continuously, a plurality of electromagnetic transducer heads respectively disposed adjacent the disks, each of said tracks having a different phonetic sound recorded magnetically thereon, a plurality of manually operable keys, each of said keys having an inscription corresponding to a different one of the sounds recorded on the respective tracks, switches associated with said keys and respectively operated thereby, and circuit means interconnecting said switches and transducer heads, so that each head picks up magnetically the recording on the adjacent track and converts the same to electrical pulses when a corresponding one of the keys is operated.

2. A phonetic vocalizing device, comprising a plurality of rotatable disk assemblies, each of said disk assemblies including a shaft and a plurality of axially spaced, parallel disks removably mounted on and rotatable with said shaft, so that any selected disks on a shaft in any one disk assembly are removable and replaceable with other disks without disturbing the other disk assemblies, each of said disks having a circumferential magnetic track thereon, motor means operatively connected to the shafts for rotating all of the disks simultaneously and continuously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of said tracks having a different phonetic sound recorded magnetically thereon, a plurality of manually operable keys, each of said keys having an inscription corresponding to a different one of the sounds recorded on the respective tracks, switches associated with said keys and respectively operated thereby, and circuit means interconnecting said switches and transducer heads, so that each head picks up magnetically the recording on the adjacent track and converts the same to electrical pulses when a corresponding one of the keys is operated.

3. A phonetic vocalizing device, comprising a plurality of rotatable disk assemblies, each of said disk assemblies including a shaft and a plurality of axially spaced, parallel disks removably mounted on and rotatable with said shaft, so that any selected disks on a shaft in any one disk assembly are removable and replaceable with other disks without disturbing the other disk assemblies, each of said disks having a circumferential magnetic track thereon, motor means operatively connected to the shafts for rotating all of the disks simultaneously and continuously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of said tracks having a different phonetic sound recorded magnetically thereon, a plurality of manually operable keys, each of said keys having an inscription corresponding to a different one of the sounds recorded on the respective tracks, switches associated with said keys and respectively operated thereby, and circuit means interconnecting said switches and transducer heads, so that each head picks up magnetically the recording on the adjacent track and converts the same to electrical pulses when a corresponding one of the keys is operated, an electronic amplifier having input and output terminals, each of said heads being connected in circuit with the input terminals and one of said switches, and a loudspeaker connected in circuit with the output terminals, so that a selected phonetic sound is audibly reproduced by said loudspeaker when a selected key is operated.

4. A phonetic vocalizing device, comprising a plurality of rotatable disk assemblies, each of said disk assemblies including a shaft and a plurality of axially spaced, parallel disks removably mounted on and rotatable with said shaft, so that any selected disks on a shaft in any one disk assembly are removable and replaceable with other disks without disturbing the other disk assemblies, each of said disks having a circumferential magnetic track thereon, motor means operatively connected to the shafts for rotating all of the disks simultaneously and continuously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of said tracks having a different phonetic sound recorded magnetically thereon, a plurality of manually operable keys, each of said keys having an inscription corresponding to a different one of the sounds recorded on the respective tracks, switches associated with said keys and respectively operated thereby, and circuit means interconnecting said switches and transducer heads, so that each head picks up magnetically the recording on the adjacent track and converts the same to electrical pulses when a corresponding one of the keys is operated, an electronic amplifier having input and output terminals, each of said heads being connected in circuit with the input terminals and one of said switches, and a loudspeaker connected in circuit with the output terminals, so that a selected phonetic sound is audibly reproduced by said loudspeaker when a selected key is operated, each of said switches having normally open contacts and a spring biased bridging contact, whereby the selected phonetic sound is repeatedly reproduced audibly while said selected key is operated to close the open contacts by said bridging contact and whereby audible reproduction of the selected phonetic sound is cut off when said selected key is released.

5. A phonetic vocalizing device, comprising a closed cabinet having top, bottom, side, front and rear walls, said top and front walls being removable from the side walls, said back wall being removable from the side, front and bottom walls to provide access into the interior of the cabinet, a plurality of rotatable disks assemblies, each of said assemblies including a shaft rotatably journaled on at least one side wall of the cabinet, and a plurality of axially spaced, parallel disks removably mounted on and rotatable with said shaft, so that any selected disks on a shaft in any one disk assembly are removable and replaceable with other disks without disturbing the other disk assemblies, each of said disks having a circumferential magnetic track thereon, a motor in said cabinet, belt drive means operatively connecting the motor and shafts for rotating all of said disk assemblies continuously and simultaneously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of the tracks having a different phonetic sound recorded magnetically thereon, means detachably mounting the head assemblies to the top of the cabinet so that all the heads are exposed when the top is removed from the cabinet, a plurality of manually operable keys located at the front wall of the cabinet, each of said keys having an inscription thereon corresponding to a different one of the sounds recorded on the respective tracks, switches on the front wall inside the cabinet associated with the keys and respectively operated thereby, and circuit means in the cabinet interconnecting said switches and transducer heads, so that each head picks up magnetically the recorded phonetic sound on the adjacent track and converts the same to electrical pulses when a corresponding one of the keys is operated.

6. A phonetic vocalizing device, comprising a closed cabinet having top, bottom, side, front and rear walls, said top and front walls being removable from the side walls, said back wall being removable from the side, front and bottom walls to provide access into the interior of the cabinet, a plurality of rotatable disk assemblies, each of said assemblies including a shaft rotatably journaled on at least one side wall of the cabinet, so that any selected disks on a shaft in any one disk assembly are removable and replaceable with other disks without disturbing the other disk assemblies, and a plurality of axially spaced, parallel disks removably mounted on and rotatable with said shaft, each of said disks having a circumferential magnetic track thereon, a motor in said cabinet, belt drive means operatively connecting the motor and shafts for rotating all of said disk assemblies continuously and simultaneously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of the tracks having a different phonetic sound recorded magnetically thereon, means detachably mounting the head assemblies to the top of the cabinets so that all the heads are removed and exposed when the top is removed from the cabinet, a plurality of manually operable keys located at the front wall of the cabinet, each of said keys having an inscription thereon corresponding to a different one of the sounds recorded on the respective tracks, switches on the front wall inside the cabinet associated with the keys and respectively operated thereby, and circuit means in the cabinet interconnecting said switches and transducer heads, so that each head picks up magnetically the recorded phonetic sound on the adjacent track and converts the same to electrical pulses when a corresponding one of the keys is operated, and electronic amplifier in the cabinet, said amplifier having input and output terminals, each of said heads being connected in circuit with the input terminals and one of said switches, and a loudspeaker mounted at the underside of said top wall and connected in circuit with the output terminals, so that a selected phonetic sound is audibly reproduced by said loudspeaker when a selected key is operated.

7. A phonetic vocalizing device, comprising a closed cabinet having top, bottom, side, front and rear walls, said top and front walls being removable from the side walls, said back wall being removable from the side, front and bottom walls to provide access into the interior of the cabinet, a plurality of rotatable disk assemblies, each of said assemblies including a shaft rotatably journaled on at least one side wall of the cabinet, so that any selected disks on a shaft in any one disk assembly are removable and replaceable with other disks without disturbing the other disk assemblies, and a plurality of axially spaced, parallel disks removably mounted on and rotatable with said shaft, each of said disks having a circumferential magnetic track thereon, a motor in said cabinet, belt drive means operatively connecting the motor and shafts for rotating all of said disk assemblies continuously and simultaneously, a plurality of electromagnetic transducer head assemblies, each of said head assemblies including a plurality of transducer heads detachably secured to each other in side-by-side relationship, the transducer heads of each head assembly being disposed respectively adjacent to the respective tracks on the disks of one of the disk assemblies, each of the tracks having a different phonetic sound recorded magnetically thereon, means detachably mounting the head assemblies to the top of the cabinet so that all the heads are removed and exposed when the top is removed from the cabinet, a plurality of manually operable keys located at the front wall of the cabinet, each of said keys having an inscription thereon corresponding to a different one of the sound recorded on the respective tracks, switches on the front wall inside the cabinet associated with the keys and respectively operated thereby, and circuit means in the cabinet interconnecting said switches and a transducer heads, so that each head picks up magnetically the recorded phonetic sound on the adjacent track and converts the same to electrical pulses when a corresponding one of the keys is operated, and electronic amplifier in the cabinet, said amplifier having input and output terminals, each of said heads being connected in circuit with the input terminals and one of said switches, and a loudspeaker mounted at the underside of said top wall and connected in circuit with the output terminals, so that a selected phonetic sound is audibly reproduced by said loudspeaker when a selected key is operated, each of said switches having normally open contacts and a spring biased bridging contact, whereby the selected phonetic sound is repeatedly reproduced audibly while said selected key is operated to close the open contacts by said bridging contact and whereby audible reproduction of the selected phonetic sound is cut off when said selected key is released.

References Cited

UNITED STATES PATENTS

| | | | |
|---|---|---|---|
| 804,604 | 11/1905 | Isakson | 274—18 |
| 1,655,510 | 1/1928 | Runyan | 35—35 |
| 1,930,286 | 10/1933 | Runyan | 35—35 |
| 3,112,569 | 12/1963 | Moore et al. | 35—5 |
| 3,136,072 | 6/1964 | Ross | 35—35 |
| 3,221,420 | 12/1965 | Heinberg | 35—35 |
| 3,264,757 | 8/1966 | Kobler | 35—5 |
| 3,276,144 | 10/1966 | Feldman | 35—5 |
| 3,281,959 | 11/1966 | Kobler et al. | 35—35 |
| 3,289,325 | 12/1966 | Shreck | 35—35 |
| 2,549,145 | 4/1951 | Vagtborg | 274—4 |

EUGENE R. CAPOZIO, *Primary Examiner.*

W. W. NIELSEN, *Assistant Examiner.*